United States Patent [19]

Buck

[11] Patent Number: 4,996,953
[45] Date of Patent: Mar. 5, 1991

[54] TWO PLUS TWO STROKE OPPOSED PISTON HEAT ENGINE

[76] Inventor: Erik S. Buck, 1106 Lipton La., Dayton, Ohio 45430

[21] Appl. No.: 503,406

[22] Filed: Apr. 2, 1990

[51] Int. Cl.$^5$ ............................................. F02B 75/28
[52] U.S. Cl. ........................... 123/58 AM; 123/48 D; 123/51 A
[58] Field of Search ....... 123/58 AM, 58 AB, 58 BC, 123/51 A, 51 B, 51 BD, 48 D, 48 A, 48 AA, 78 R, 78 D, 254, 255, 268, 292

[56] References Cited

U.S. PATENT DOCUMENTS

| | | | |
|---|---|---|---|
| Re. 30,565 | 4/1981 | Kristiansen | 123/48 AA |
| 974,853 | 11/1910 | Bock | 123/292 |
| 1,126,713 | 2/1915 | Crew | 123/51 A |
| 1,145,820 | 7/1915 | Summeril | 123/58 BC |
| 1,714,364 | 4/1927 | Hall | 123/51 A |
| 1,788,140 | 1/1931 | Woolson | |
| 1,808,083 | 6/1931 | Tibbetts | 123/58 AM |
| 3,809,030 | 5/1974 | Moiroux | 123/292 |
| 3,868,931 | 3/1975 | Dutry et al. | 123/51 R |
| 4,037,572 | 7/1977 | Franz | 123/68 |
| 4,136,647 | 1/1979 | Stoler | 123/45 R |
| 4,149,498 | 4/1979 | Ferrell | 123/58 AA |
| 4,212,163 | 7/1980 | Mikina | 60/39.63 |
| 4,300,512 | 11/1981 | Franz | 123/64 |
| 4,553,508 | 11/1985 | Stinebaugh | 123/58 AA |
| 4,565,165 | 1/1986 | Papanicolaou | 123/51 BA |
| 4,570,580 | 2/1986 | Jackson | 123/52 B |
| 4,716,720 | 1/1988 | Eickmann | 60/39.6 |

Primary Examiner—Willis R. Wolfe
Assistant Examiner—Thomas N. Moulis
Attorney, Agent, or Firm—Biebel, French & Nauman

[57] ABSTRACT

Combustion engines have opposed pistons in one or more cylinders, with the piston motion determined by cams. Ports, for intake and exhaust, are at one end of the cylinder, opened or closed by one piston, with the combustion chamber at the other end, and the engine being well suited to the optional use of a combustion chamber separate from the cylinder and with the communicating passages controlled by the other piston. That arrangement makes the engine particularly suitable for using heavy or unconventional fuels. The cam profile provides for a four-stroke cycle; one piston moves during the intake and exhaust strokes, while the second piston moves for compression and power strokes. Thus the advantages of a four-stroke engine are obtained while retaining the simplicity of a two-stroke engine. The cam profile may be tailored to the burning characteristics of the fuel, as by providing a period of dwell between the end of the compression stroke and the beginning of the power stroke. The engine is well suited to the use of compression ignition, but spark ignition is feasible. The isolated combustion chamber may also be replaced by a heat exchanger, to use an external heat source.

31 Claims, 9 Drawing Sheets

TWO PLUS TWO STROKE OPPOSED PISTON HEAT ENGINE

BACKGROUND OF THE INVENTION

1. Field of the Invention

My invention is a heat engine, and more particularly, an opposed piston engine in which a gas is heated, causing the gas pressure to increase as the volume enclosed between the pistons increases. The expanding and cooling gas performs mechanical work in forcing the pistons apart, while the motion of the pistons is communicated to a shaft or other useful output.

Typically, the gas would be air heated by the burning of a gaseous, liquid, or slurry fuel in the volume between the pistons or in a separate chamber communicating with such volume. However, the invention is also suitable for use with a heat exchanger, in which heat is added to the working fluid (gas) by conduction through the walls of the heat exchanger. Thus, the invention may be categorized as either an internal combustion engine or an external combustion engine. In the latter, heat need not come from combustion but might be supplied by focused sunlight, nuclear sources, geothermal heat, or any other source at a temperature substantially above ambient.

2. Desctription of the Prior Art

Piston engines are ubiquitous. Except for the steam engine, the Stirling engine (which is rare), and certain "hot air" engines of the past, piston engines are almost invariably internal combustion engines. The most common internal combustion engine is the four-stroke engine, in which a piston in a cylinder moves in an intake stroke to increase the volume of the cylinder, a compression stroke to decrease the volume, a power stroke, and exhaust stroke; a total of four strokes in a cycle. When the piston is actuated by a crank and connecting rod, there is one power stroke per cylinder for each two revolutions of the crank. The volume of the cylinder is contained within the walls of the cylinder, the crown of the piston, and a cylinder head. The flow of air into and out of that volume is controlled by valves, usually poppet valves, but occasionally sleeve or rotary valves. The addition of heat to the air, between the compression and power strokes, is the result of burning fuel in the air. Sometimes the fuel is added to the air before the air is inducted into the cylinder, and the mixture is later ignited by a spark. Compression ignition engines (diesels) typically inject the fuel into the compressed and therefore hot air, where the fuel burns as it mixes with the air.

The two-stroke engine is typically simpler and lighter than the four stroke engine. In the two-stroke engine, the heated air is exhausted and fresh air introduced into the cylinder during that period when the cylinder volume is greatest. The exhaust is motivated not by the motion of the piston but by its own pressure and by the incoming fresh air. Means, such as a blower, must be provided to motivate the incoming fresh air since there is no intake stroke to draw it into the cylinder. When the piston moves toward the cylinder head there is compression; when it moves away there is expansion, i. e., the power stroke. In the two-stroke engine, there is one power stroke per cylinder for each revolution of the crank. While some two-stroke engines employ moving valves, it is common to provide ports in the cylinder walls which are covered and uncovered by motion of the piston. This results in a notably simpler engine, eliminating the complex valve mechanism.

The two-stroke cycle is well adapted to diesel engines, because the intake air can be used to scavenge the exhaust gases from the cylinder without the loss of fuel. Fuel is not introduced until the exhaust valves/ports are closed. Particularly attractive is the opposed-piston two-stroke compression-ignition engine, in which there are two opposing pistons in the cylinder, one controlling exhaust ports, the other controlling intake ports. That type of engine, which has no cylinder head or valve train, can be very powerful for its weight and volume. For example, fifty years ago, the Junkers Jumo 223 diesel developed 2,000 horsepower with a weight of only 2,000 lbs., and it was compact enough to fit in a volume a meter in diameter and less than 2 meters long.

There is another kind of internal combustion piston engine, the five-stroke engine (Tibbetts, U. S. Pat. No. 1,808,083 and subsequent variations), which attempted to combine the volumetric efficiency and other attractive attributes of the four-stroke engine with the simplicity and compactness of the opposed piston two-stroke engine. Like the two-stroke engine, the five-stroke engine has intake ports at one end of the cylinder controlled by one piston, and exhaust ports at the other end controlled by a second piston. There is an intake stroke, in which the piston controlling the intake ports (the first piston) is essentially still, while the second piston draws in a fresh charge of air. The two pistons approach each other, compressing the air, and, after combustion in the space between the pistons, they move apart for the power stroke. Then the second piston uncovers the exhaust ports while the first advances to expel the exhaust gases, until both pistons are at the exhaust ports end of the cylinder. The fifth stroke, a return stroke, is necessary to move both pistons back to the starting position at the intake end of the cylinder.

Unlike other engines, with the five-stroke engine, the exhaust and intake ports (valves) are never open at the same time, so that if a fuel-air mixture is inducted (e.g., through a carburetor), there is no possibility of the mixture departing through the exhaust ports or mixing with exhaust gases. Of course, direct injection, as in a diesel engine, is also feasible. However, the fifth stroke has two disadvantages: it takes time, making for a slower engine, and it presents some difficulties in achieving dynamic balance, although a multi-cylinder five-stroke engine can be arranged with symmetrical motions to achieve good balance. The rather complex piston motion is achieved with a cam mechanism.

Cam actuated piston engines have a long history. There were several development efforts during the period between the World Wars, and a few were actually marketed commercially. Most were of the "barrel engine" type, in which the cylinders are arranged around and parallel to a central shaft, like the staves of a barrel. There is, at present, an FAA certificated aircraft engine, the "Dyna-Cam," Dyna-Cam Engines, 105 N. Irena #1, Redondo Beach, Calif. 90277, which is a six-cylinder, twelve piston, four-stroke, spark-ignition engine which uses a cam and roller cam followers. The cam is symmetric, with two undulations per revolution, so the four-stroke cycle is accomplished in one revolution of the shaft. This has the effect of a 2:1 reduction gear with no gears, and also provides symmetric piston motions, so that the "Dyna-Cam" balances nicely. It is also notably powerful for its size and weight.

The art of using cams and cam followers is also well developed. The cam, for instance, can have a groove in which the cam follower moves, or it can have a raised track which is straddled by the cam follower. The follower can employ rollers or sliding members, which are supported hydrodynamically on a wedge of lubricant.

It is also generally necessary to provide members which act as a crosshead, either integral with the piston or separate. Whether sliding or rolling, the crosshead absorbs the component of the resultant force on the cam follower which is perpendicular to the direction of piston motion. Essentially, the forces on the crosshead relate to the torque on the cam in most configurations. There are many arrangements of cams and cam followers which are possible and which should be obvious to one skilled in the art. It should also be possible to replace a cam with a gear train, using, for instance, non-circular epicyclic gears. The inventor knows of no case where that has been demonstrated.

One characteristic of known opposed piston internal combustion engines, prior to this invention, is that the combustion takes place between the opposing piston crowns. The fuel injectors or spark plugs necessarily reside at the cylinder wall; no central location is possible. Because it takes time for the flame front and/or the fuel spray to progress to fill the chamber, it is practically required that there be multiple spark plugs or injectors. The Jumo 223 diesel had four injectors per cylinder, for a total of 96. If, however, the pistons are actuated by cams, it should be possible for the pistons to dwell, essentially stationary, at the end of the compression stroke. This option is absent with a crank-type engine. By thus providing a longer period of time for heat to be introduced into the working fluid, the engine maker can adjust the piston motion to the burning characteristics of the fuel or, in the extreme case, let the fluid be heated by conduction through a heat exchanger. The inventor does not know of a case where an externally heated cam engine has actually been demonstrated in the prior art. conventional (one piston per cylinder) four-stroke diesel engines have a long history of using "precombustion" chambers, "auxiliary air" chambers, "hot bulbs", and "energy cells" to promote the smooth and complete combustion of fuels. A few even had provision for isolating an auxiliary chamber with a valve, to raise the compression ratio for starting. Apparently, all of those engines had chambers which, during normal operation, communicated with the cylinder. The pressure in the chamber approximated the pressure in the cylinder, and a timed, high pressure injection of fuel was necessary. None employed a valve to isolate the chamber from the cylinder during the injection of fuel, to permit the use of fuel at low pressure, and none timed the ignition of fuel by the valving of the compressed air from the cylinder. (Some engines used compressed air from an external source to assist in atomizing the fuel, a very different concept.)

There are piston engine concepts (e.g., Mikina U.S. Pat. No. 4,212,163) which use a separate combustion chamber, but they are not engines in which the same cylinder is used for both compression and power; the thermodynamic cycle is closer to the Brayton cycle than to the Otto or Diesel cycle.

The object of this invention is to provide the means whereby the advantages of the five-stroke engine may be obtained without some of the disadvantages. Using a novel piston motion, it becomes possible to build piston engines which are light, compact, well balanced, simple, durable, efficient, and economical, with the option to use a carburetor, conventional fuel injection, low pressure fuel injection into an isolated chamber, or an external heat source and a heat exchanger. The last two listed options enable the engine to be used with unconventional fuels or heat sources.

SUMMARY OF THE INVENTION

The invention comprises a novel operational process and engine which has opposed pistons in one or more cylinders, with the piston motion determined by cams. Ports, for intake and exhaust, are at one end of the cylinder, opened or closed by one piston, with the combustion chamber at the other end.

The engine is well suited to the optional use of a combustion chamber separate from the cylinder and with the communicating passage controlled by the other piston. That arrangement makes the engine particularly suitable for using heavy or unconventional fuels.

A cam profile provides for a four-stroke cycle: one piston moves during the intake and exhaust strokes, while the second piston moves for compression and power strokes, which may be referred to as a "two-plus-two stroke cycle". Thus the advantages of a four-stroke engine are obtained while retaining the simplicity of a two-stroke engine.

The cam profile may be tailored to the burning characteristics of the fuel, as by providing a period of dwell between the end of the compression stroke and the beginning of the power stroke, and, depending on the combustion rate of the fuel and the speed of the piston, the thermodynamic cycle may be adjusted between a constant volume heat input (Otto cycle) and a constant pressure heat input (Diesel cycle). The engine is well suited to the use of compression ignition, but spark ignition is feasible. The isolated combustion chamber may also be replaced by a heat exchanger, to use an external heat source.

The features and advantages of the engines in accordance with this invention and method may be summarized as follows. The rotary output shaft is straight and stiff and may be hollow. Therefore it can be lightweight. The cams may be identical and mounted reversed and out-of-phase, thereby saving expense. In a preferred embodiment, each of the pistons move only half the time thereby contributing to long life.

The engine is symmetrical around the center line of the shaft, which means that the loads are symmetrical and that there are no bending moments on the shaft. With an even number of cylinders, that is four or more, typically eight, twelve or sixteen, for every motion there is an equal and opposite motion resulting in inherent dynamic balance.

Main bearings are lightly loaded and the structure itself is lightly loaded except at the crossheads. Since the crossheads are part of a compact assembly which also contains the engine mounts, the total weight is low.

There are no conventional valves, valve guides, rocker arms or the like as in conventional engines. Similarly, there are no counterweights or timing gears.

In another embodiment, the combustion chambers are external to the cylinder and are thus easily replaceable. Also, they are easily heated, if need be for starting, and they remain hot during the operation. This is particularly helpful in burning fuels of low volatility.

When employing an external combustion chamber, as shown, the fuel need not be atomized and low pressure, simple, robust and inexpensive valve arrangements may be used in place of the usual high-pressure injector.

In the diesel or compression ignition version, ignition timing is controlled by one of the pistons uncovering the fuel injector or port connecting the external chamber to the cylinder. The quantity of fuel which is admitted into the chambers is controlled by the pressure on a common fuel line which supplies the chambers. In this manner, the fuel distribution system is simplified by the use of a single, simple fuel pump or pressure source which may be of relatively low pressure.

In the engine of this invention, the number of moving parts, the number of parts which must be lubricated and/or cooled, the number of parts which must be mounted on bearing supports and, where appropriate, sealed, is substantially reduced in the elimination of the usual valve train and camshaft drive. The fuel injection system permits the burning of multiple fuels and provides for the admission of fuel to be burned under relatively low pressure while employing relatively simple fuel flow control devices.

When an external combustion chamber is used, the design of the engine provides versatility in the burning of fuel, and generally hard-to-burn fuels can be used, such as heavy oils, powdered coals, or the like. The engine also provides versatility in the manner in which the fuel may be ignited. In its simplest form, fuel automatically flows into the external combustion chamber, when the chamber pressure is low, and shuts off as the chamber pressure increases during the compression stroke. The chamber may be in continuous communication with the cylinder during the compression stroke. However, if desired, the cam may be profiled so as to permit the precompression of the gases between the pistons, during the compression stroke, to achieve a desired high temperature, followed by the movement of the first piston to uncover the port leading to the external chamber to effect combustion of the fuel therein. Similarly, in the engine of this invention, the cam may be easily profiled to allow a dwell at the maximum compression or what would otherwise be known as the "top dead center" position of the conventional engine, to provide ample time for the conduction of heat to take place. The latter could be a particularly useful adaptation, when the fuel itself is inherently slow to burn, such as a solid fuel, or where heat is being added externally through the walls of the external combustion chamber or admitted through an energy transparent port into the interior of the chamber.

The basic engine design may be adapted for spark ignition, or glow plug ignition. The latter has the advantage of permitting the design of a totally wet engine, that is one which can be used in an environment in which the exterior of the engine can be doused with water or soaked, for example, with salt water, since the conventional high tension ignition and related parts are eliminated.

Further, the engine has the advantage that the basic design may be readily converted to diesel by replacing the spark plugs or the glow plugs with conventional diesel injectors, and the compression ratio adjusted accordingly. Finally, the timed high pressure fuel injectors may be eliminated and the separate external combustion chamber fitted, further reducing complexity to an absolute minimum, and permitting the burning of diverse fuels.

As a subordinate feature, provision may be made for adjusting the volume of the external combustion chamber and/or including a catalyst within the chamber or enhancing combustion. In a multiple cylinder engine, the position of the chambers may be suitably staggered to permit the close placement of the cylinders.

The design of the external combustion chamber can be tailored to the particular engine, fuel, and speed requirements and controlling the movement of the pistons by the cams. For example, efficiency may be improved by causing the pistons to continue to approach each other thereby reducing the clearance space therebetween to a minimum. This has the effect of forcing oxygen into the chamber, ensuring that the fuel and air are well mixed and that the combustion can take place mainly in the chamber, rather than in the cylinder, if that is desirable. This could also be desirable to assure even and complete combustion of slow burning or corrosive fuels. By a proper selection of volumes, compression ratios, design of the fuel port(s), and timing, it is possible to confine a major portion of the ignition and combustion to the external chamber thereby protecting the cylinder walls from the worst of the combustion reactions.

It is accordingly an important object to provide a two-plus-two stroke engine in which cylinders have pairs of cam-operated opposed pistons which move in symmetry. The engine is useful in converting heat power to useful motive power, such as rotary motive power, with internal or external combustion or with heat energy supplied in the form of high energy gas or steam.

Another important object is the provision of an opposed piston engine and method, as outlined above, ideally suited for the combustion of diverse fuels. A particular advantage resides in the use of an external combustion chamber, with simple and trouble-free fuel inlet arrangements which may be tailored to the requirements of the particular fuel.

Further objects and advantages of the invention will be apparent from the appended drawings and the following description.

BRIEF DESCRIPTION OF THE DRAWINGS

FIG. 1 is a diagram illustrating the principles of operation of the invention with a cylinder and a pair of opposed pistons in which FIGS. 1A through 1D respectively show the piston pairs at the conclusion of each of the four strokes;

FIG. 6 illustrates three possible cam and follower configurations in which

DETAILED DESCRIPTION OF THE PREFERRED EMBODIMENTS

The four views of FIG. 1 illustrate the basic cycle of this invention, in which a pair of opposed pistons 10 and 12 are shown in a single common combustion cylinder 13. The views FIGS. 1A through 1D represent successive piston positions in a cycle of operation.

Crosshead assemblies 14 support the pistons 10 and 12 within the cylinder 13, and carry roller cam followers 15 which are in contact with the surface of an annular cam 16. For the purpose of this analysis, the piston 10 is an "intake" piston, while the piston 12 is a "power" piston. The piston cylinder 13 is shown as rotating, so that centrifugal force will assure a continuous contact between the cam followers 15 and the enclosing cam surface 16. The direction of rotation is illustrated by the arrow in FIG. 1A. However, in a practical application, the cam 16 would rotate while the cylinders remain relative stationary.

Figure 1A:
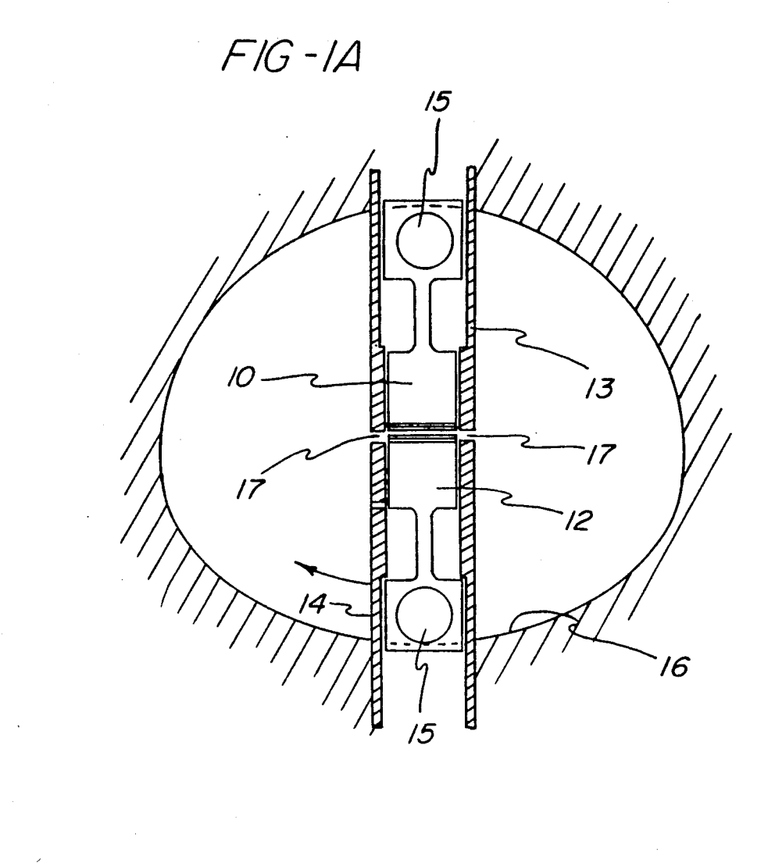

In FIG. 1A, the intake piston 10 is still or non-moving at this point with respect to the cylinder 13, and the exhaust ports 17 formed in the cylinder wall are uncovered by the piston 12. As the cylinder rotates from the position of FIG. 1A to the position of FIG. 1B, piston 10 moves in an intake stroke drawing air in through the ports 17. The position of the power piston 12 remains essentially unchanged.

Figure 1B:
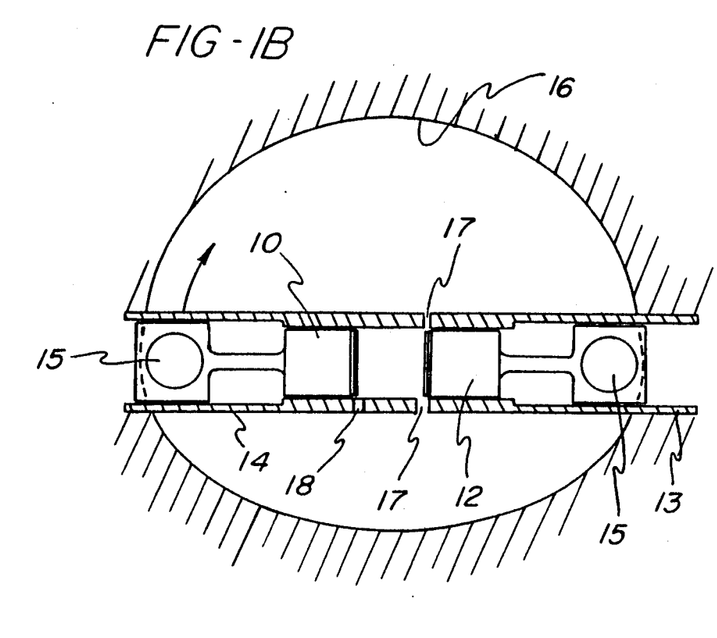
Figure 1C:
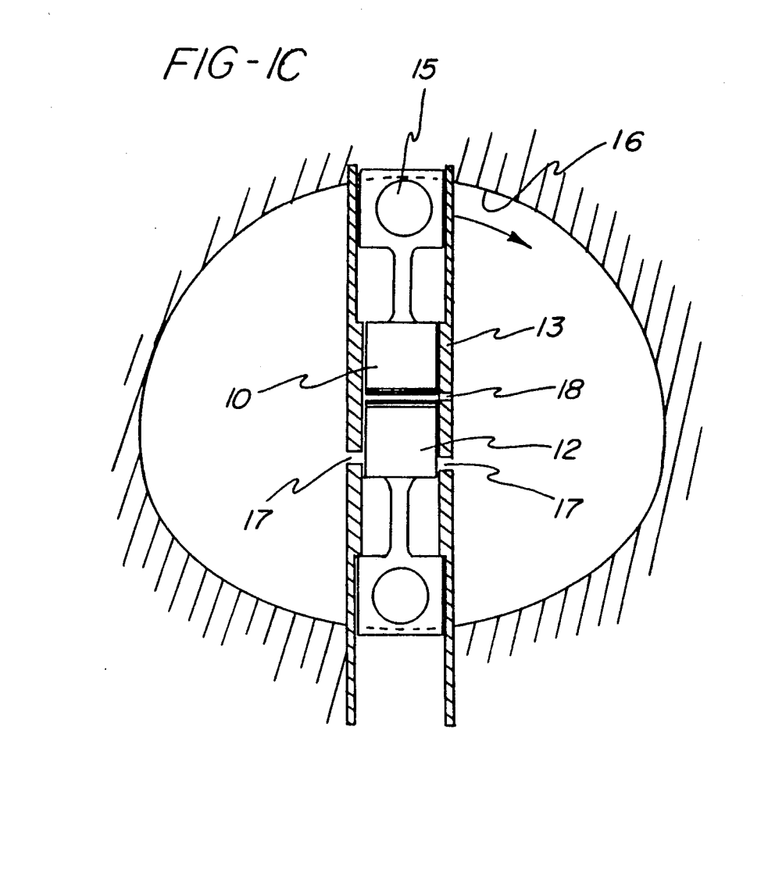

With continued rotation of the cylinder 13 from FIG. 1B to FIG. 1C, the intake piston 10 remains relatively still, in its retracted position, and the power piston is caused to advance toward piston 10, compressing the air trapped therebetween, since the advancing piston 12 has covered the intake ports 17. Also, at the point shown in FIG. 1C, a fuel injector or fuel inlet or spark plug 18 is uncovered by piston 10, and ignition occurs, causing heat to be added to the air, and raising the pressure.

Figure 1D:
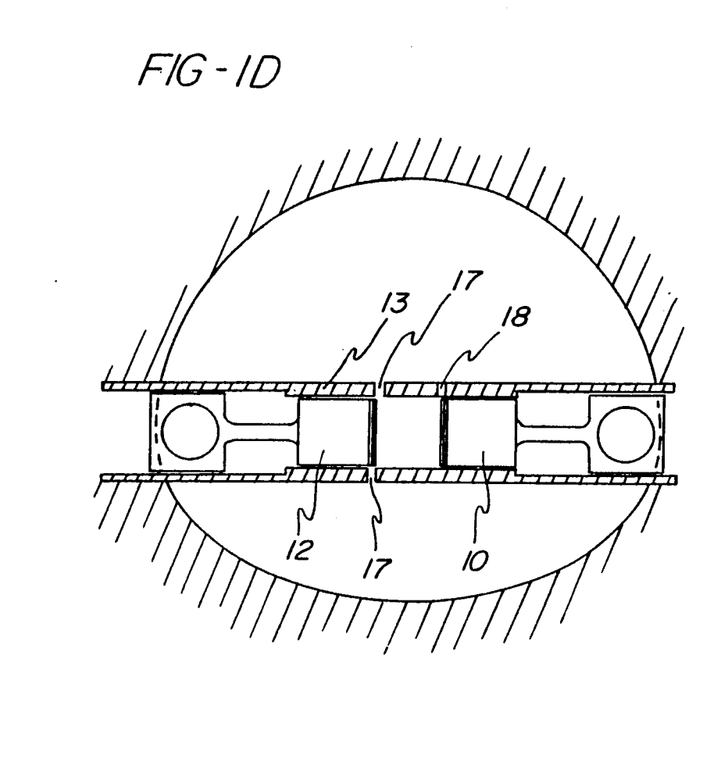

Between the views of FIGS. 1C and 1D, the intake piston continues to remain relatively constant in position while the power piston 12 is motivated by the increased gas pressure, until the exhaust ports 17 are again opened to exhaust the burnt gases. Then, between FIGS. 1D and 1A, the intake piston 10 advances toward the now non-moving piston 12 to expel residual exhaust gases through the ports 17 and complete the cycle. It will be seen, from the above-described cycle, that only one of two pistons is moving at any one time, the two pistons share in performing the four necessary strokes of a four-cycle engine in a single revolution of the cylinder.

Figure 2:
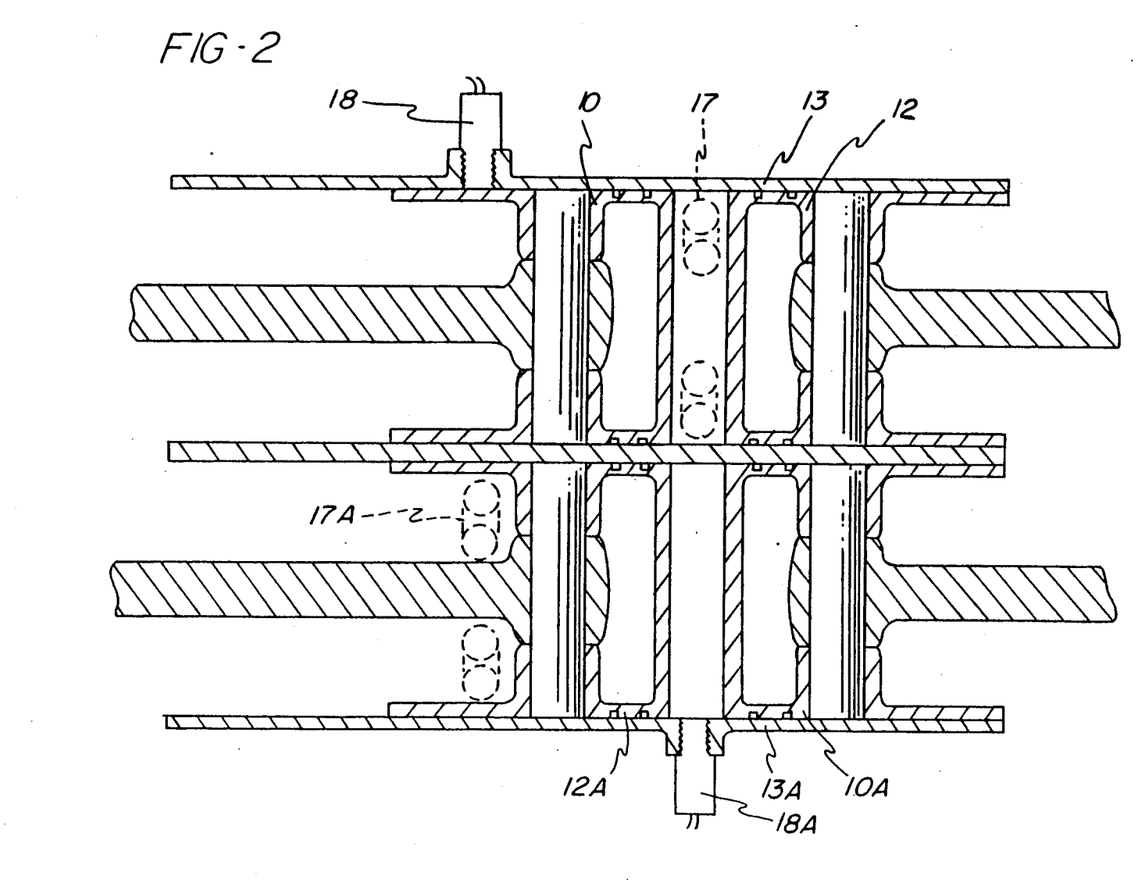
FIG. 2 is a partially diagrammatic sectional view showing a modification of the basic mechanism with pairs of cylinders.

Referring to FIG. 2, a basic mechanism is illustrated in which pairs of cylinders are employed, and avoid the need for rotating the cylinder assembly, if a single acting cam is used. In FIG. 2, like reference numerals are used to designate like parts, as previously illustrated in FIG. 1. A pair of cylinders 13 and 13a are used, the relative position of the intake and power pistons 10 and 12 are reversed with respect to the pistons 10A and 12A. Similarly, the relative position of the ports 17, 17A and injector or plug 18, 18A are reversed. The piston assemblies 10 and 12 are coupled so that the power stroke of each of the power pistons 12 and 12a serve to motivate the intake stroke of the corresponding intake piston 10 or 10a.

Figure 3:
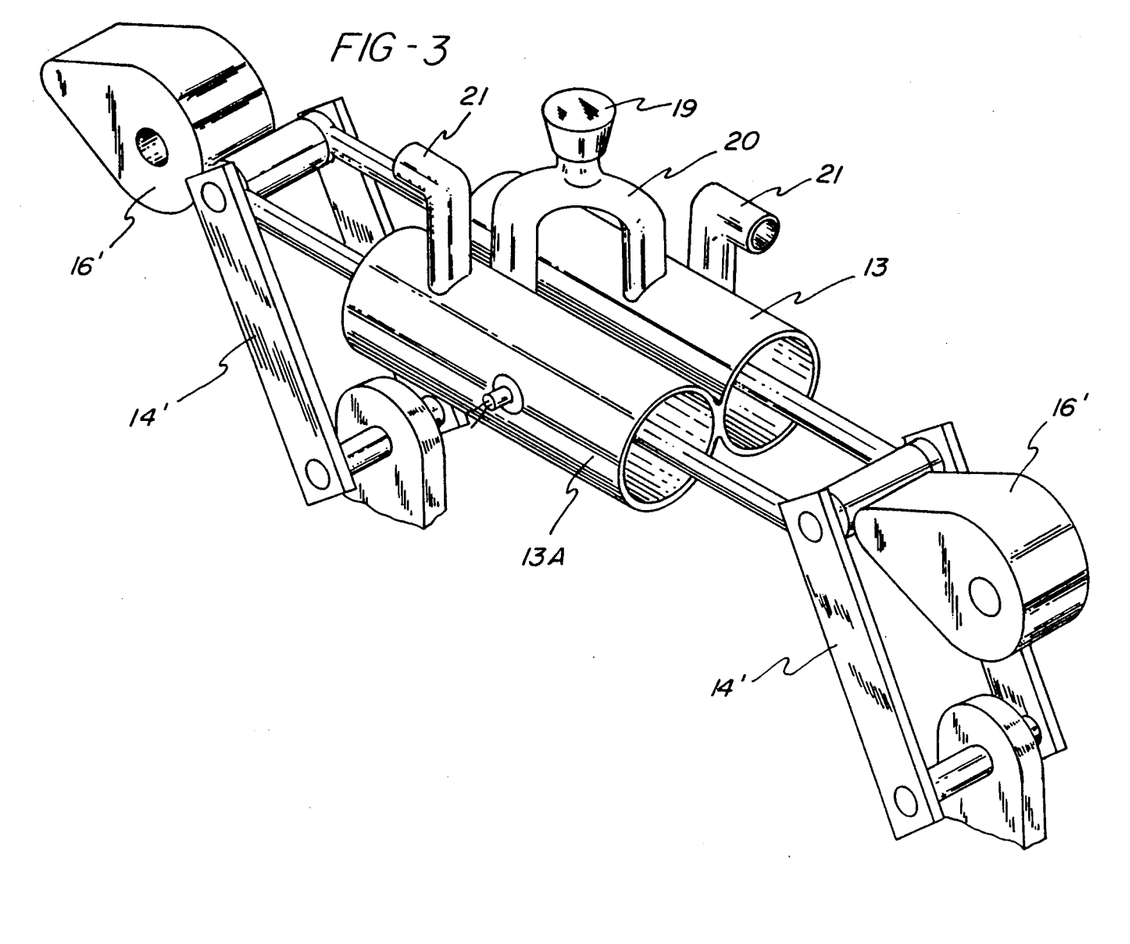
FIG. 3 illustrates a crosshead mechanism and cam follower arrangement for use in the employment of the embodiment of FIG. 2.
Figure 4A:
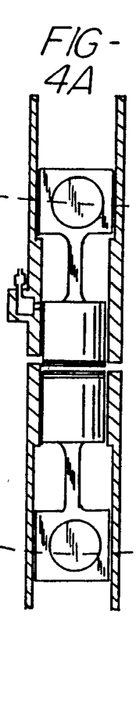
FIG. 4 illustrates a series of moved positions for paired pistons in an improved process cycle, and further illustrates the use of an external combustion chamber in which views A through H and A represent stages in the complete cycle.
Figure 4B:
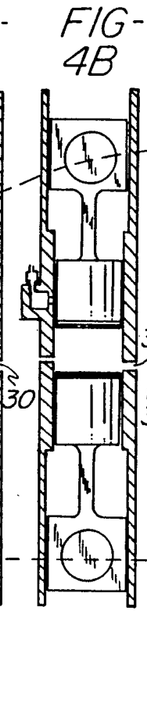
Figure 4C:
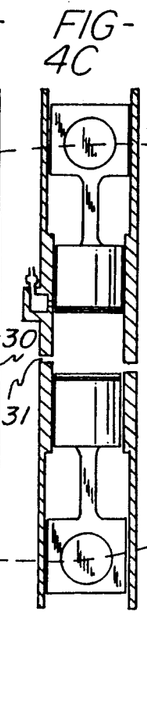
Figure 4D:
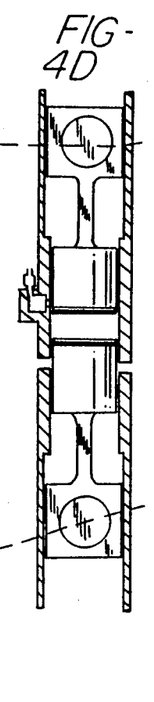
Figure 4E:
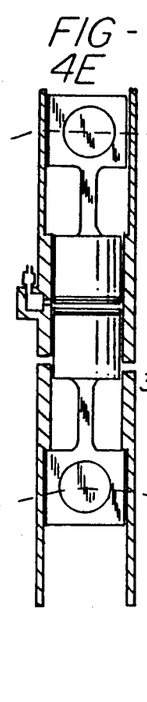
Figure 4F:
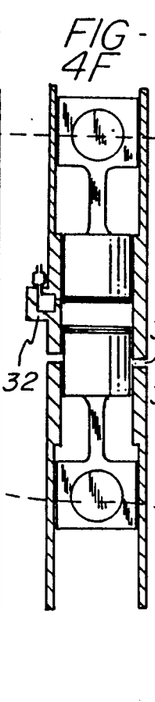
Figure 4G:
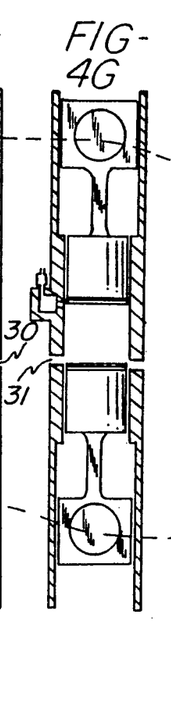
Figure 4H:
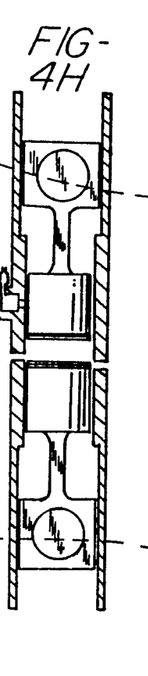

FIG. 3 shows how the paired cylinders 13, 13a of FIG. 2 might be used with the crosshead and cam following roller modified, employing a linkage 14' instead of a sliding crosshead 14. The cams 16' are geared or chained together, although one cam could be used with rocker arms replacing the links 14'. Also shown are a carburetor 19, and an intake manifold 20 and exhaust pipes 21 communicating with the ports 17. With this arrangement, it is necessary to put simple one-way valves (e.g., flap or reed valves, not shown), in the manifolds 20 and 21, so as to prevent the mixing of intake and exhaust gases.

In further explanation, a pair of cylinders 13 and 13a, each include an intake piston and a power piston in mutually reversed relation or relative position, and the cams are complementary and identical. One of the cams is connected to a cross-head to operate the intake piston in one cylinder and the compression piston on the other, while the other cam operates the compression piston in the first cylinder and the intake piston in the second cylinder.

The views which make up FIG. 4 represent a further development of the "two plus two" cycle, and show successive positions of the two opposed pistons 10 and 12 in a single cylinder 13. The intake port 30 and the exhaust port 31 are not at the same location on the axis of the cylinder. Rather, the exhaust port 31 is opened before the intake port 30 is opened by the piston 12.

There has also been added a separate or external combustion chamber 32 which communicates with the cylinder through a small fuel inlet port 32a. At position A, the air intake port 30 is uncovered. Fuel can flow through the injector 18 into the chamber 32.

The injector 18 is a simple nozzle which admits fuel from a fuel line with the chamber 32 through a one-way check valve. It is a "fuel dribbler," rather than a conventional injector. Fuel will flow into the chamber 32 whenever the fuel line pressure exceeds the pressure in the chamber which is kept hot (poorly cooled), at a temperature approximating the ignition temperature of the fuel. The fuel, however, does not immediately burn, for lack of oxygen.

At position B, the intake piston 10 is moving away from the piston 12 to draw air into the cylinder through the open intake port 30. The exhaust port 31 is open, but exhaust gases do not enter the cylinder for reasons discussed elsewhere. At position C, the intake piston 10 has stopped, while still covering the internal chamber port 32a, and the power piston 12 begins to move toward piston 10 closing the ports 30, 31 and compressing the air between the pistons.

Position D represents the piston positions partly through the compression stroke. Fuel has continued to flow into the chamber 32 where it is vaporized/pyrolyzed until the vapor pressure of the fuel equals the fuel line pressure, when fuel flow stops. While the pressure in the chamber may continue to rise, the check valve in the injector 18 prevents vapor from entering the fuel line.

At position E, both pistons 10 and 12 move to uncover the chamber port 32a and allow the hot air compressed between them to enter chamber 32. Because both the gaseous (vaporized) fuel and the air, heated by compression, are at ignition temperature, ignition, where the air and fuel vapor mix, is very rapid. There is not detonation, however, because of the "stratified charge" effect which limits burning to the interface of the fuel and air. The high speed jet of air consumes all of the fuel, heating the air and increasing the pressure. Because the walls of chamber 32 are hot, there is no cool boundary layer. Combustion is complete, preventing the distasteful odors of partially burned fuel (mostly aldehydes).

The chamber port 32a remains uncovered during the power stroke at position F when the pressure of hot gases motivates the power piston 12. At position G, the exhaust port 31 is uncovered, by the piston 12, allowing most of the gases to escape from the cylinder. The pressure in the chamber 32 drops to approximately atmospheric pressure (exhaust manifold pressure), and fuel can once more flow through the check valve from the low pressure fuel supply line. Piston 10 closes off the chamber port and advances to expel the residual exhaust gases (exhaust stroke, position H). At the end of the exhaust stroke, both pistons return to position A.

It will be seen that the movement of the pistons is entirely symmetrical, as represented by the cam profile lines 36 and 37 which compliment each other. The position of the pistons at position A is the mirror image of position E. Position B mirrors that of position F. Positions C and G, D and H are comparable. If there are multiple cylinders 13 in an engine, with pistons moving out of phase, dynamic balance is achieved. If the actuating cams have two or more cycles per revolution of the shaft, the engine is perfectly symmetrical, and there are no bending moments in the shaft or unbalanced couples.

If the injected fuel is all or partially composed of water, and the external chamber 32 is kept hot, the working fluid becomes air plus steam. Thus, the engine is well suited to using, for example, a slurry of coal or sewer sludge as fuel. It should be obvious that if the chamber 32 is configured with a large, heat conductive surface area relative to the volume, and if it is kept hot by some external source (burning fuel, focused sunlight, geothermal heat, nuclear wastes, etc.), the air in the chamber 32 will be heated by conduction, and it is not necessary to inject fuel at all. The cam can be cut with a period of dwell at position E, so as to allow additional time for the heating to occur. As previously mentioned, a wall of the chamber may be transparent to actinic radiation, or heat may be applied to the chamber by combustion through a wall.

Because the fuel dribbler (injector) 18 is simple and is not required to pump the fuel, it will be relatively insensitive to the viscosity or lubricity of the fuel, allowing the use of a wide variety of fuels (such as slurries, heavy oils, alcohols, or dirty solvents) which would be unsuitable for use with a conventional high pressure injector. The rate of fuel flow (hence the power setting of the engine) is determined by the control of the fuel line pressure, and the timing of ignition is controlled not by the fuel injector but by the air injection which occurs when the chamber port is uncovered (position E).

While it should not be necessary, the separate chamber 32 allows for the inclusion of a catalyst therein to promote combustion. While a simple cylindrical chamber is shown, a convoluted chamber, with a large surface area, may be more suitable for some fuels. For example, catalyst coated ceramic elements, similar to the material in automotive catalytic converters, would promote cold starting and complete combustion.

Figure 5:
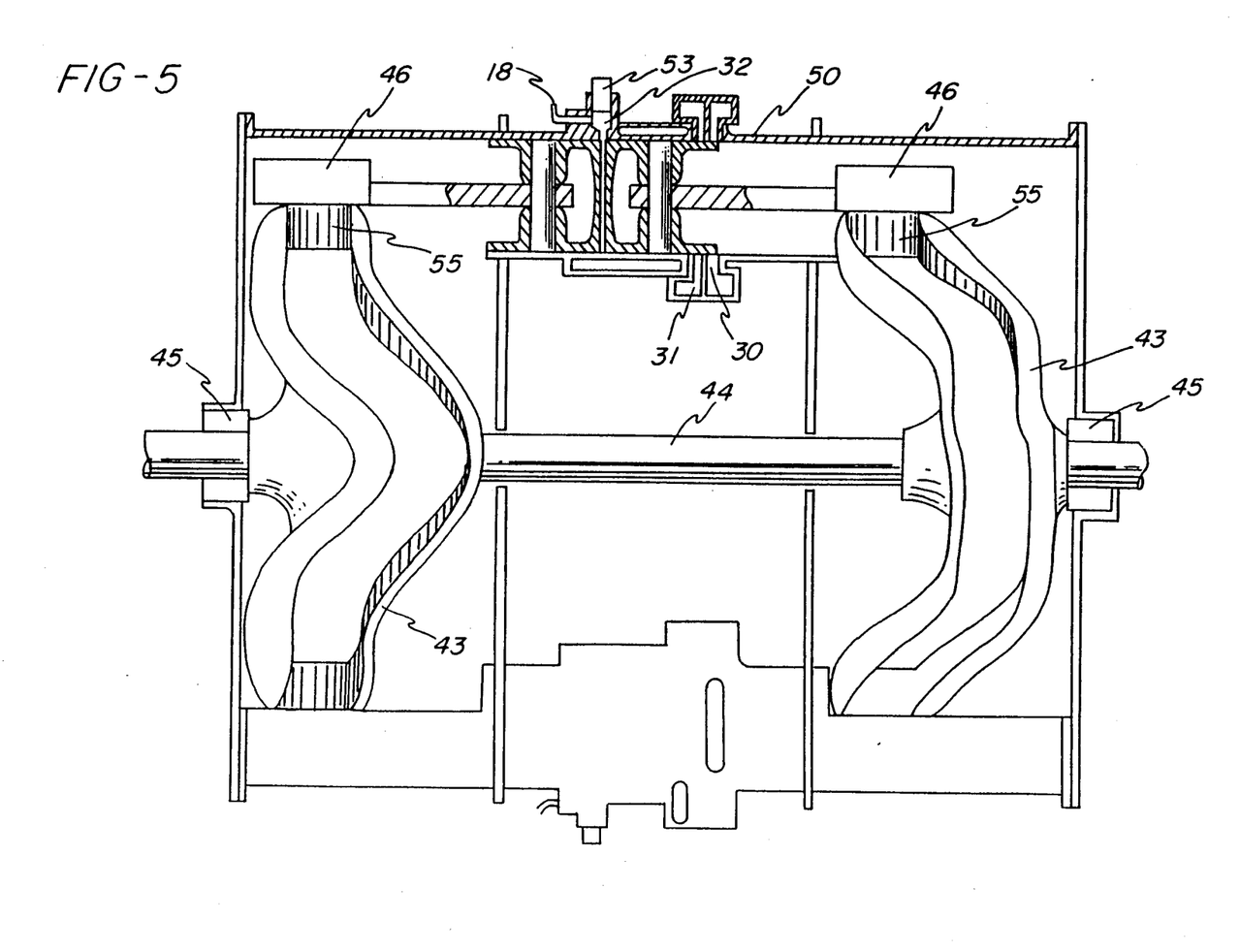
FIG. 5 shows a partial cut-away or section of an engine which employs the combustion cycle as illustrated in FIG. 4 and showing two of eight cylinders.

FIG. 5 illustrates, in cut-away, an eight cylinder, barrel-type engine (two cylinders shown) which uses the "two plus two" cycle depicted in FIG. 4 and a common shaft 44. The cams 43 mounted on shaft 44, can be identical; they are simply mounted reversed and out of phase. The symmetry of the piston motions is apparent; the shaft 44 and shaft bearings 45, can be light, as compared with the crank and main bearings of a conventional engine. The crossheads 46 absorb all force components perpendicular to the cylinder 50 axis. That avoids bending moments in the cylinders 50, allowing lighter cylinders, and vastly reduces piston ring and cylinder wall wear. There is, of course, no heavy cylinder head, which further reduces engine weight, as compared with a conventional four-stroke engine.

As shown, there would be two complete four-stroke cycles for each revolution of shaft 44. It should be evident that cams could be made which provide three, four, or more complete cycles per shaft revolution. This effectively reduces the rotational speed of the shaft without reducing the linear speed of the pistons and without employing additional parts, such as gears.

The external combustion chamber 32 is shown with a plunger 53, adjustable or movable in the chamber, which can be used to change the volume of the chamber, hence the effective compression ratio of the engine. For cold starting, the plunger 53 can be moved to increase the compression ratio, thus raising the temperature of the injected air, while it can be withdrawn (perhaps "spring loaded") to limit peak pressures and temperatures at high power settings. The cam followers 55 are shown as rollers in a grooved cam, but other configurations are possible, as shown in FIG. 6. Also, the intake port 30 and exhaust port 31 are shown, as previously described in connection with FIG. 4.

Figures 6A, 6B, 6C:
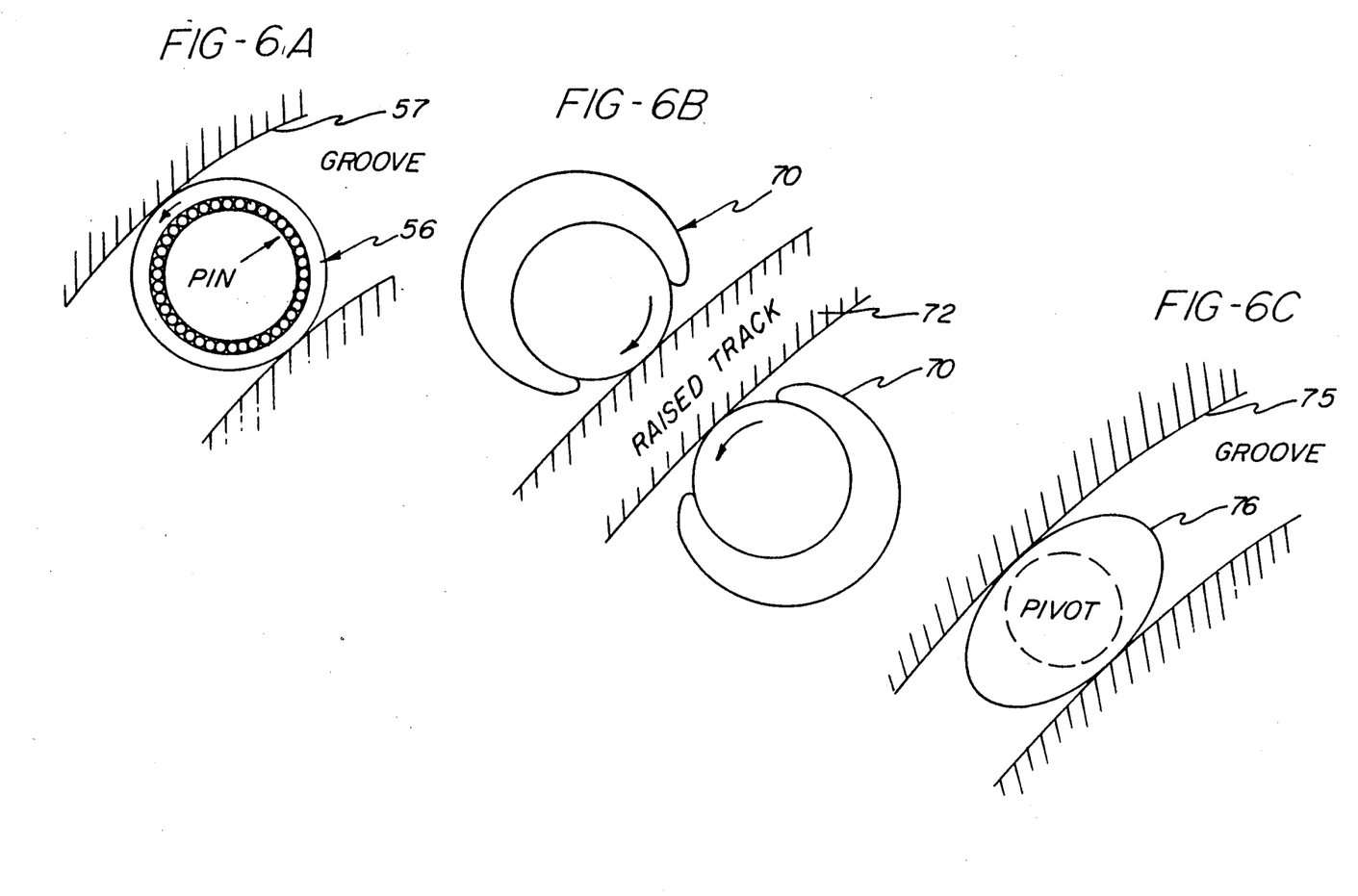
FIGS. 6A illustrates a needle bearing roller in a groove.
FIG. 6B illustrates tapered rollers straddling an elevated cam track.
FIG. 6C illustrates a typical configuration of a slipper cam follower.
Figure 7A:
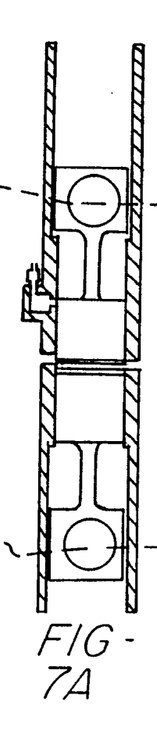
FIGS. 7, A-F and A are diagrams similar to FIG. 4 showing the employment of an asymmetrical cam to provide for an increased expansion ratio, where desired.
Figures 7B, 7C:
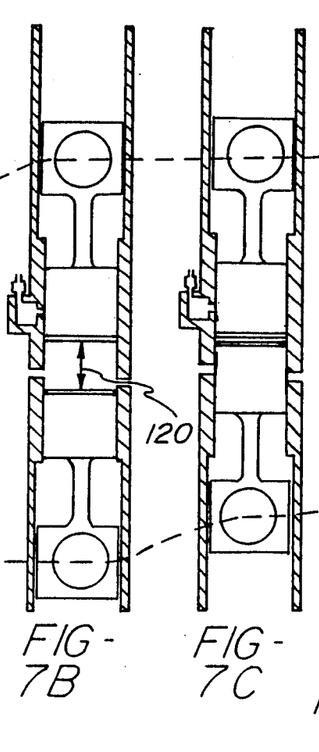
Figure 7D:
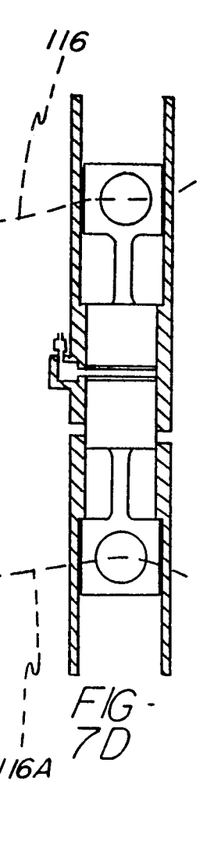
Figure 7E:
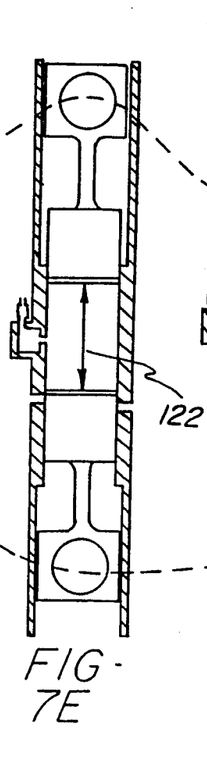
Figure 7F:
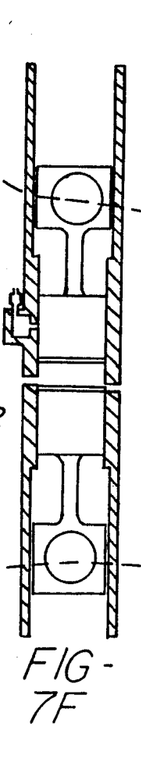

FIG. 6A shows a needle bearing roller 56 in a groove 57. During the intake stroke, the forces on the roller reverse in direction, leading to possible scuffing. FIG. 6B shows tapered rollers 70 straddling a raised or elevated cam track 72. The cam can be lighter, and there is always rolling contact between the rollers and the cam, no scuffing. The rollers are supported like a journal bearing, supported on a wedge of lubricant, a more robust bearing than the needle bearing. FIG. 6C shows one configuration of a "slipper" cam follower 76 in a groove 75 which, because it hydrodynamically rides on a film of lubricant, distributes the load on the cam, as compared with a roller, and thus stresses the cam surface less, eliminating fatigue and spalling.

Figure 8A:
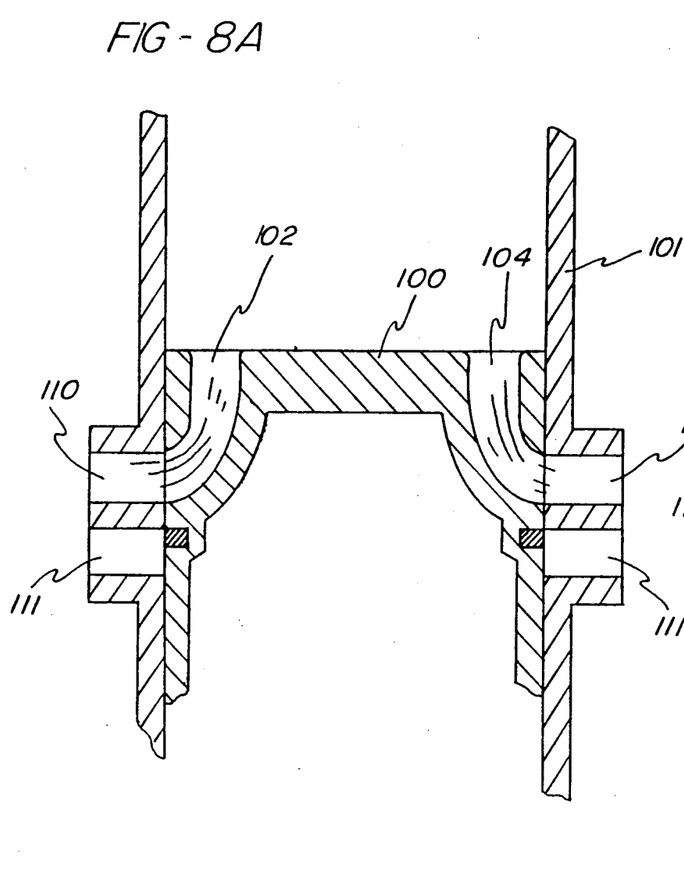
FIGS. 8A and 8B illustrate a modification for preventing exhaust gases from diluting the intake air.
Figure 8B:
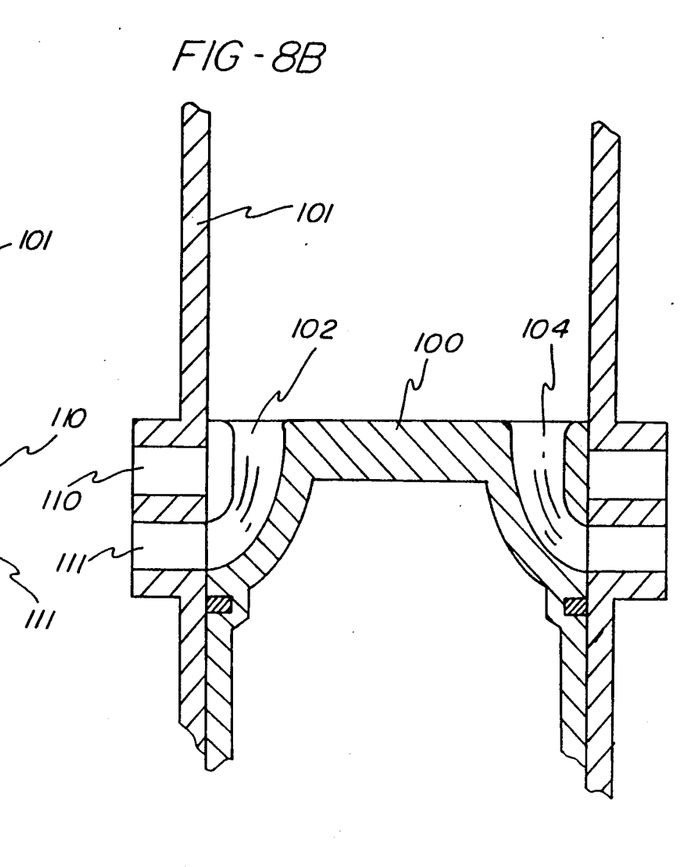

FIGS. 8A and 8B shows an arrangement for preventing exhaust gases from significantly diluting the intake air by using a perforated or ducted piston 100 as a valve in a cylinder 101. The piston crown is formed with integral internal ports or passages 102 and 104 leading from the piston top to a lateral side position to communicate with the inlet and exhaust ports formed in the cylinder wall. FIG. 8A shows the exhaust ports 110 open during the exhaust stroke and closed, with the intake ports 111 exposed, during the intake stroke, FIG. 8B. Other methods to prevent dilution include tuning the exhaust to keep the exhaust manifold pressure below the intake pressure, that is, using the kinetic energy of the exhaust to drop the pressure, or using a blower (supercharger) to pressurize the intake manifold, or using a simple one-way valve in the exhaust, or a turbine rotor in the exhaust, or close to the ports, such that the rotor would be spun by the initial exhaust impulse and then, because of its angular momentum, acting as a pump, would prevent the exhaust flow from reversing.

The sequential views of FIG. 4 represent the use of symmetrical complimentary cam profiles. FIG. 7 illustrates the same cylinder and piston parts employing an asymmetrical cam profile 116,116a. The asymmetrical cam profile illustrated in FIG. 7 can improve engine efficiency by providing an increased expansion ratio.

With a convention crank-type engine, the piston always moves the same distance up as it moves down. It is commonly thought that efficiency is increased with a higher compression ratio, but efficiency really depends upon the expansion ratio, that is, how much the gas can expand and cool before it is exhausted. The invention, with the employment of an asymmetrical cam, permits the expansion ratio to exceed the compression ratio. In this manner, the spark ignition engine, limited by the octane rating to a compression ratio of, for example, 8:1 could have an expansion ratio of, for example, 15:1 thereby achieving or approaching the thermal efficiency and cool exhaust of a diesel cycle engine.

FIG. 7 shows one of a number of possible ways of changing the cam profile for extending the stroke of the intake piston 10. Position A of FIG. 7 shows the beginning of the intake stroke of piston 10 while Position B shows the end of the intake stroke. The volume between the pistons 10 and 12 in indicated by the arrow 120. Position C of FIG. 7 is the end of the compression stroke, while Position D is the combustion phase. Position E of FIG. 7 shows the position of the pistons at the end of the power stroke. Note that the volume between the pistons 10 and 12 is greater than it was at the end of the intake stroke of Position B, as represented by the arrow 122. Thus, in the engine of FIG. 7, the expansion ratio is greater than the compression ratio. The additional work done by the gases expanding into the additional volume, that is the difference in volume between Position B and E, is essentially free and the exhaust is cooler with less wasted heat.

The employment of cams for operating the pistons 10 and 12 provides a large degree of control over piston movement, not available in a conventional crank-type engine. This is true even where symmetrical cams are used and alternate pistons and cylinders are reversed in axial position, about the engine, to provide symmetry. Thus, the power piston 12, which controls the ports 30 and 31, may pause in its motion during the exhaust stroke while the intake port 30 is covered, and then moved to uncover the intake port. It has already been noted that the piston 10 may pause at the end of the intake stroke while continuing to cover the port 32a to the external chamber, and then move toward the end of the compression stroke to uncover the port. Similarly, a pause or dwell may be built in, during combustion, during which time the external chamber 32 is opened to the interior of the cylinder, to allow heat to be communicated to the working fluid, and to provide for complete combustion of difficult fuels.

It is also obvious to those skilled in the art that a large number of cam and cam follower arrangements are available to convert the axial motion of the pistons into useful rotary motion in addition to those which have been illustrated in FIG. 6. The cam shaft axis may be parallel to the cylinder axis or non-parallel, in accordance with needs. The cam may be single or double acting, and as illustrated, the followers may slide or roll against the cam surface.

It will therefore be seen that this invention provides a combustion process, using at least a pair of pistons in a common cylinder in which a full four-cycle operation is achieved in a single revolution or fraction of a revolution, and in which the movement of the opposed pair of pistons is symmetrical. While the process and apparatus has been disclosed using either a single cylinder or a pair of counter acting cylinders, it will be understood that a plurality of cylinders and opposed pistons may be employed as shown, for example, in connection with the embodiment of FIG. 5.

Additionally, the concept is one which permits the utilization of unconventional fuels, due to the extreme simplicity of design and due to the elimination of the need for fuel injection under extreme pressures. Thus, the concepts embodiment within the engine permit the employment of the engine for either internal or external combustion and permits the optimization of constant pressure versus constant combustion volume as may be profiled into the respective cams.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An engine, comprising at least one cylinder, a pair of opposed pistons in said cylinder including a power piston and an intake piston and defining a variable space therebetween,
    means interconnecting said pistons to convert axial movement of said pistons in said cylinder into rotary motion,
    means for delivering combustion fuel into said space between said pistons,
    means in said cylinder defining an exhaust port and an air intake port,
    said ports being positioned in said cylinder so that they are covered and uncovered by said power piston,
    said intake piston being movable from a retracted position spaced from said power piston providing for the entrance of fuel into said space to an extended position in proximity to said air intake and exhaust ports,
    said power piston being movable between a retracted position in which said air intake and exhaust ports are uncovered to an extended position toward said intake piston in proximity to intake piston,
    said rotary connecting means causing said intake piston to move in a cycle from said extended position toward said retracted position, and causing said power piston to move from its said retracted position toward said intake piston to compress and heat gasses trapped therebetween, and causing said intake piston to move to said retracted position,
    said power piston being movable in a power stroke toward said retracted position until said exhaust port is uncovered for exhaust of burnt gasses from within said cylinder,
    said rotary connecting means then causing intake piston to move from its retracted toward said power piston onto purge the cylinder of burnt fuel.

2. The engine of claim 1 in which said means for delivering combustion fuel into said cylinder includes a combustion chamber external to said cylinder, and a combustion fuel inlet port in said cylinder wall connecting said combustion chamber to said cylinder.

3. The engine of claim 1 in which said means for delivering combustion fuel into said cylinder includes a carburetor and gas conduit means connecting said carburetor to said cylinder.

4. The engine of claim 1 in which said means for delivering combustion fuel into said cylinder includes a fuel injector positioned on said cylinder to inject fuel into said space between said pistons.

5. In a heat engine suitable for multiple fuel operation, having a cylinder, first and second opposed pistons in said cylinder including a power piston and an intake piston, and cam means interconnecting said pistons to convert axial movement of said pistons in said cylinder into rotary motion, the improvement comprising:
- an external combustion chamber,
- one-way fuel valve means for admitting fuel from a source of fuel into said chamber,
- a fuel inlet port leading from said chamber and opening into said cylinder so it is covered and uncovered by axial movement of said intake piston,
- means in said cylinder defining an exhaust port and an air intake port spaced from fuel inlet port and located so that they are covered and uncovered by said power piston,
- said intake piston being movable from a retracted position in which said fuel inlet port is uncovered to an extended position in proximity to said air intake and exhaust ports,
- said power piston being movable between a retracted position in which said air intake and exhaust ports are uncovered to an extended position toward said intake piston in proximity to said fuel inlet port,
- said rotary connecting means causing said intake piston to move in a cycle from said extended position toward said retracted position, and causing said power piston to move from its said retracted position toward said intake piston to compress and heat gasses trapped therebetween, and causing said intake piston to move to said retracted position so as to uncover said fuel inlet port and admit said hot compressed gasses into said external chamber for combustion of said fuel,
- said power piston being movable in a power stroke toward said retracted position until said exhaust port is uncovered for exhaust of burnt gasses from within said cylinder, said rotary connecting means then causing intake piston to move from its retracted position to recover said inlet port toward said power piston to purge the cylinder of burnt fuel.

6. The engine of claim 5 in which fuel is admitted into said chamber only during times when said inlet port is covered by said intake piston.

7. The engine of claim 5 in which said interconnecting means causes said intake piston to pause while said power piston is moving, and said power piston is caused to pause while said intake piston is moving.

8. The engine of claim 5 further comprising cam means for delaying the opening of said inlet port by said intake piston until the air between said pistons is compressed in said compression stroke.

9. The engine of claim 5 further comprising means for adding heat energy to said external chamber.

10. The engine of claim 5 further comprising means for varying the volume of said external chamber.

11. The engine of claim 5 further comprising duct means in said power piston communicating with said exhaust and intake ports in the retracted position thereof and opening into the interior of said cylinder between said pistons.

12. In an opposed piston engine including at least one cylinder and a pair of opposed pistons in said cylinder to compress a working gas and provide a power stroke with means for converting the movement of the pistons into useful rotary motion, the improvement comprising:
- means in a wall of said cylinder defining an intake port and an exhaust port,
- one of said pistons being movable in a compression stroke to accomplish compression of the working gas in the space between said pistons, and in a power stroke providing form the expansion of said gasses, and being movable with respect to said outlet and intake ports for selectively covering and uncovering said ports for exhaust of burnt fuel through said outlet port and for the admission of combustion air through said intake port,
- the other said piston being moveable with respect to said one piston in an intake stroke away from said one piston and an exhaust stroke toward said one piston,
- means for delivering fuel into said cylinder during said intake stroke,
- and means for igniting said fuel during said compression stroke.

13. The engine of claim 12 in which said pistons operate in a four-stroke cycle.

14. The engine of claim 12 in which said means for admitting fuel includes a combustion chamber external to said cylinder, a combustion chamber port opening into said cylinder, and one-way fuel inlet valve means connected to admit fuel under relatively low pressure into the interior of said external chamber.

15. The engine of claim 14 further comprising means for varying the volume of said chamber.

16. The engine of claim 14 in which said chamber contains a catalyst.

17. The engine of claim 14 in which said combustion chamber port is uncovered by said one piston after gasses between said piston pair has been heated by compression by movement of said other piston toward said one piston.

18. The engine of claim 12 in which said cylinder is a first cylinder, and a second said cylinder positioned alongside said first cylinder and having a pair of pistons therein identical to the pistons in said first cylinder and reversed in relative position, a first cam means connected to operate the intake piston of said first cylinder and the power piston of said second cylinder, and a second complimentary cam connected to operate the power piston of said first cylinder and the intake piston of said second piston.

19. An improved cam-operated barrel type engine in which a plurality of generally axially extending cylinders are arranged in angularly spaced relation and each have pair of opposed pistons which are operated by drive cams common to all of said cylinders, the improvement comprising a separate external combustion chamber for each of said cylinders, port means connected each said chamber to its associated said cylinder, fuel inlet means for admitting fuel into the interior of each said chamber, said fuel inlet means effective to admit said fuel when the pressure in the associated said chamber is lower than the fuel pressure, and valve means for preventing fuel or vapor flow out of a said chamber and into a fuel supply line.

20. The method of operating a heat engine having a pair of opposed pistons in a common cylinder, in which said opposed pistons are caused to operate in a cycle of operation including at least an intake, a compression, a power and an exhaust stroke, and in which an external combustion chamber communicates with said cylinder through a port controlled by one of said pistons, comprising the steps of admitting fuel to be burned into said external chamber while said port is covered by said one piston, and causing gasses trapped between said pistons to be compressed and heated to a combustion temperature by relative movement of the other piston in the cylinder toward said first piston prior to the opening of said port by said first piston, and causing said first piston to open said port to admit the highly compressed and heated gasses into said chamber for combustion.

21. The method of claim 20 further comprising the step of moving the first piston during combustion in a direction to yield an expansion ratio greater than the compression ratio.

22. The method of claim 20 including the further step of causing the first piston to pause in its cycle of operation with the inlet port open to provide an extended time for the heat to be communicated to said chamber.

23. The method of claim 20 including the further step of supplying heat to said chamber from a source of heat external to said cylinder.

24. The method of claim 23 including the step of supplying fuel to said chamber under pressure, and in which the quantity of fuel admitted into said chamber is dependent upon said fuel pressure.

25. The method of claim 20 including the step of delaying the opening of said external combustion chamber port to said one piston until the gas between said pistons is substantially compressed by a compression stroke of said second piston.

26. The method of operating a heat engine having a pair of opposed pistons in a common cylinder, in which said opposed pistons are caused to operate in a cycle of operation including at least a compression, a power and an exhaust and an intake stroke, and in which an external combustion chamber communicates with said cylinder through a port controlled by one of said pistons, comprising the steps of admitting fuel to be burned into said external chamber during said intake stroke, causing gasses trapped between said pistons to be compressed and heated to a combustion temperature by relative movement of the other piston in the cylinder toward said first piston during said compression stroke, and moving said first piston relative to said port during said compression stroke to admit compressed and heated gasses into said chamber for combustion, maintaining said port open during said power stroke.

27. The method of claim 26 in which fuel applied to said chamber from a fuel supply line of relatively constant pressure through a check valve, and in which fuel is admitted from said line into said chamber when the pressure in said chamber is less than the pressure of the fuel in said supply line.

28. The method of operating an opposed piston fuel burning engine in which a combustion cylinder has an opposed pair of pistons defining an intake piston and a power piston, in which the movements of the pistons are controlled by profiled cams, and the cylinder has intake and exhaust ports controlled the movement of the power piston and including a means for admitting fuel into the space between the pistons for combustion and expansion, comprising the steps of causing the intake piston to move in an intake stroke away from the power piston during the time that the power piston has uncovered an intake port and causing air to be drawn into the cylinder, causing the power piston to move toward the intake piston to close the intake and exhaust ports in a compression stroke, causing fuel to be admitted into the space between the pistons to form a fuel/air mixture in the cylinder for combustion, causing combustion of such mixture at or near the end of said compression stroke, causing said power piston to move away from said intake piston in a power stroke to open at least said exhaust port, and causing said intake piston to move toward said power piston to purge the space therebetween of burnt fuel gasses.

29. The method of claim 28 further including the step of moving said intake piston away from said power piston during said power stroke to effect an expansion of the compression ratio of the engine.

30. The method of claim 28 in which said exhaust port is opening during said power stroke before the intake port is opened.

31. The method of claim 28 in which the cylinder is formed with a fuel inlet port controlled by the movement of said intake piston, and which said inlet port is caused to be opened by said intake piston during said intake stroke thereof.

* * * * *